United States Patent [19]

Southwell

[11] Patent Number: 4,666,250

[45] Date of Patent: May 19, 1987

[54] INTERFERENCE FILTER DESIGN USING FLIP-FLOP OPTIMIZATION

[75] Inventor: William H. Southwell, Thousand Oaks, Calif.

[73] Assignee: Rockwell International Corporation, El Segundo, Calif.

[21] Appl. No.: 723,762

[22] Filed: Apr. 16, 1985

[51] Int. Cl.$^4$ .............................................. G02B 5/28
[52] U.S. Cl. .................................... 350/166; 350/320
[58] Field of Search ............................. 350/164–166, 350/320

[56] References Cited

PUBLICATIONS

Berning, Use of Equivalent Films in the Design of Infrared Multilayer Antirelection Coatings, Journal of the Optical Society of America, vol. 52, pp. 431–436, (1962).
Dobrowolski, Completely Automatic Synthesis of Optical Thin Film Systems, Applied Optics, vol. 4, p. 937 (1965).
Epstein, The Design of Optical Filters, Journal of the Optical Society of America, vol. 42, pp. 806–810 (1952).
Snedaker, New Numerical Thin–Film Synthesis Technique, Journal of the Optical Society of America, vol. 72, p. 1732 (1982).
Southwell, Gradient–Index Antireflection Coatings, Optics Letters, vol. 8, p. 584, (1983).
Yadava, et al., Optical Behavior of Gradient–Index Multilayer Films, Thin Solid Films, vol. 21, p. 297 (1974).

Primary Examiner—Bruce Y. Arnold
Attorney, Agent, or Firm—H. Fredrick Hamann; Craig O. Malin; John J. Deinken

[57] ABSTRACT

An antireflective optical film is placed between an incident media and a substrate to effect minimal reflectivity from the incident media-substrate interface over a broad spectral band. The film is designed by selecting a first material with a low refractive index and a second material with a high refractive index. A theoretical film is defined with a plurality of thin layers of equal thickness. The low refractive index or the high refractive index material is specified for each layer in the film. The reflectivity of the theoretical film is evaluated. The refractive index of one of the layers is changed to the alternate index and the reflectivity of the defined film is reevaluated. If the reflectivity of the film is improved, the alternate refractive index is assigned to the changed layer. The steps of changing, reevaluating, and assigning are repeated for each of the layers in the film until no further improvement in the reflectivity of the film is obtained. The thin layers may be defined with equal physical or optical thickness and should be substantially thinner than wavelengths within the spectral band to be reflected by the film. The initial refractive index profile may be defined with all of the layers having the low refractive index, all of the layers having the high refractive index, the layers having alternately low and high refractive indices, or such that the initial refractive index profile for the film approximates a predetermined gradient index profile.

16 Claims, 5 Drawing Figures a b a b

INTERFERENCE FILTER DESIGN USING FLIP-FLOP OPTIMIZATION

BACKGROUND OF THE INVENTION

This invention relates to the design of optical coatings for reducing the amount of light which is reflected from an optical surface.

Modification in the intensity of light which may occur when two or more beams of light are superposed is known as interference. The principle of superposition states that the resultant amplitude is the sum of the amplitudes of the individual beams. The brilliant colors, for example, which may be seen when light is reflected from a soap bubble or from a thin layer of oil floating on water are produced by interference effects between two trains of light waves. The light waves are reflected at opposite surfaces of the thin film of soap solution or of oil.

One important practical application for the principles of interference in thin films involves the production of coated optical surfaces. If a film of a transparent substance is deposited on glass, for example, with a thickness which is one quarter of a particular wavelength of light in the film, the reflection of that light from the glass surface can be almost completely suppressed. The light which would otherwise be reflected is not absorbed by a nonreflecting film; rather, the energy in the incident light is redistributed so that a decrease in reflection is accompanied by a concomitant increase in the intensity of the light which is transmitted.

Nonreflecting films are of practical importance because they can be used to greatly reduce the loss of light by reflection at the various surfaces of an optical system. Stray light, which could otherwise reach the image because of these reflections, can also be substantially eliminated, with a resulting increase in contrast. Such improvements are particularly useful where an image is formed by a highly corrected lens system which employs a large number of air-glass surfaces. Consequently, almost all optical components of high quality are coated to reduce reflection. These coatings were first made by depositing several monomolecular layers of an organic substance on glass plates. More durable coatings may be fabricated by evaporating calcium or magnesium fluoride on the surface in a vacuum, or by chemical treatment with acids which leave a thin layer of silica on the surface of the glass.

Considerable improvements have been achieved in the antireflective performance of such films by using a composite film having two or more superimposed layers. The use of gradient index layers, in which the index of refraction within the layer is made to vary continuously as a function of depth in the layer, further increases the degrees of freedom available in the design of such films. Modern applications of optical technology, however, require antireflective films with even lower levels of reflection than have previously been attainable in the art. One of the ways in which higher performance antireflective layers have been obtained is through utilizing digital equivalents of continuous gradient index layers. The spectral performance of an arbitrary generalized gradient index interference coating may be closely approximated by some digital configuration which is a sequence of thin layers each having a high or a low refractive index. It is the goal of this invention to further advance the performance of antireflective coatings by providing a new technique for defining an optimized digital index profile for a film with a given thickness and spectral performance.

SUMMARY OF THE INVENTION

The invention provides an antireflective optical film which, when placed between an incident media and a substrate, effects minimal reflectivity from the incident-substrate interface over a broad spectral band.

The film is designed by the steps of selecting a first material with a low refractive index and a second material with a high refractive index, then defining a theoretical film with a plurality of thin layers of equal thickness. The low refractive index or the high refractive index is specified for each layer in the film and the reflectivity of the theoretical film is evaluated. The refractive index of one of the layers is then changed to the alternate index and the reflectivity of the defined film is reevaluated. If the reflectivity of the film is improved, then the alternate refractive index is assigned to the changed layer. The steps of changing, reevaluating, and assigning are repeated for each of the layers in the film until no further improvement in the reflectivity of the film is obtained.

In a more particular embodiment, each layer in the film is made substantially thinner than wavelengths within the spectral band to be reflected by the film. The step of defining the theoretical film may further define the thin layers to be of equal physical thickness or of equal optical thickness.

In another embodiment, the step of specifying the low index or the high index for each layer may specify the low index for all of the layers or specify the high index for all layers. The layers may be specified to initially have alternately low and high refractive indices. The refractive indices may be defined such that the initial refractive index profile for the film approximates a predetermined gradient index profile.

DESCRIPTION OF THE DRAWINGS

Additional details of the invention are presented in the section entitled Description of the Invention, which refers to the following drawings.

DESCRIPTION OF THE INVENTION

This invention addresses the problem of designing a high performance digital antireflective coating from materials with two discrete values of refractive index so that the digital coating closely approximates a gradient index coating.

Figure 1:
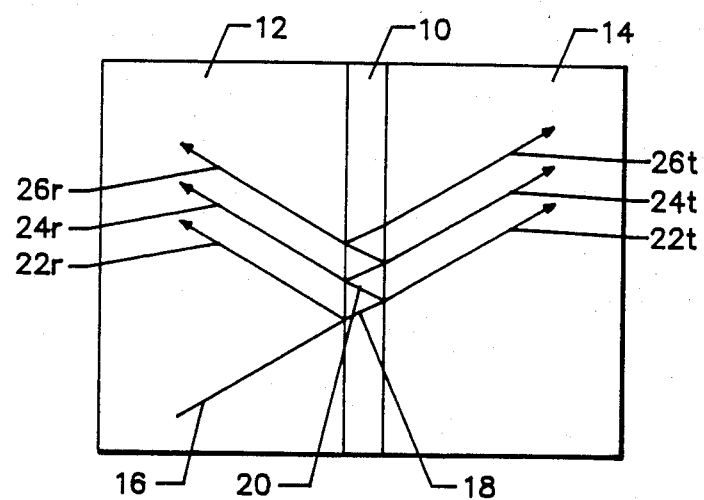
FIG. 1 is a cross sectional side view of an optical interface with an antireflective film.

FIG. 1 is a cross sectional side view illustrating an optical interface with an antireflective film. As those skilled in the art will appreciate, some of the dimensions in this drawing are greatly exaggerated in order to effectively illustrate the optical interference phenomena which are involved. An antireflective film 10 is placed between an incident media 12 and a substrate media 14, with the incident media having a lower index of refraction than the substrate media. When a ray of light 16 traverses this system, a portion of the light is refracted and a portion is reflected at each interface between the different media. Thus the incident ray 16 is divided into a reflected ray 22r and a refracted ray 18 at the boundary between the incident media 12 and the film 10. Similarly, the refracted ray 18 divides into a reflected ray 20 and a reflected ray 22t at the boundary between the film 10 and the substrate media 14. This division continues at the incident media-film and film-substrate media boundaries for each ray which is internally reflected within the film, resulting in a series of reflected rays 22r, 24r, 26r... and a series of transmitted rays 22t, 24t, 26t.... The antireflective film 10 is designed to have a refractive index profile and a thickness which are calculated to minimize the total intensity of the reflected rays 22r, 24r, 26r.... This minimal reflection is to be accomplished for those light rays with wavelengths within a predetermined range of the optical spectrum.

It is difficult, however, if not impossible, to actually fabricate a true gradient index profile film, because the actual materials which can be used to make such films are available with only discrete values of refractive index. A gradient index profile can be approximated, however, by dividing a theoretical fixed thickness gradient index film into many incremental layers each having a discrete refractive index value. The number of layers is chosen to be sufficiently large that each layer is substantially thinner than wavelengths within the spectral band which is to be antireflected, thereby causing the index variation to appear substantially continuous.

According to the Herpin equivalent, any symmetrical combination of thin films is equivalent at any given wavelength to a simple layer. See Epstein, The Design of Optical Filters, Journal of the Optical Society of America, Volume 42, Page 806 (1952). This equivalence has proven to be a useful tool in the design of interference coatings. The Herpin equivalent is also commonly used in reverse, that is, to find a symmetrical three-layer combination of high and low index layers to substitute for a single layer of some unattainable index.

The use of Herpin equivalent layers in the design of coatings has been described by Epstein. Two important features of Herpin equivalent layers are that they are equivalent only at one wavelength and that they apply only to symmetrical combinations (3, 5, or some odd number of layers).

Berning has shown that when Herpin equivalents are applied to very thin layers (i.e., layers with optical thicknesses much less than the wavelengths of interest) the resulting configuration does not suffer from dispersion. Berning, Use of Equivalent Films in the Design of Infrared Multilayer Antireflection Coatings, Journal of the Optical Society of America, Volume 52, Page 431 (1962). This means that the symmetrical three-layer combination has the same spectral response as the single thin layer. This non-dispersive feature could be deduced from Epstein's paper by examining his plots of equivalent index versus phase thickness (which is proportional to $1/\lambda$). In the limit of thin layers the equivalent index is independent of wavelength. But Berning went on to point out that this dispersion-free property can be extended to layers of any thickness. This may be accomplished by simply dividing the layer into many thin layers and then replacing each thin layer by its symmetrical three-layer equivalent.

Thin layers, however, are not only equivalent at all wavelengths but they also need not be symmetrical. That is, a simple high-index/low-index layer pair of appropriate thicknesses will be equivalent to a given single layer whose index is bracketed by the high-low pair. Furthermore, any arbitrary interference coating consisting of homogeneous or inhomogeneous gradient-index layers is equivalent to a sequence of high and low index layers. This generalized equivalence principle may be used to formulate a synthesis algorithm which exhibits rapid convergence for broadband antireflection coatings.

In designing such a film, the assumption is made that a thin layer (i.e., one having an optical thickness much smaller that the wavelengths of interest) with an arbitrary index of refraction may be approximated by a pair of high and low index layers having the same total physical and optical thickness. This assumption leads to a simple algorithm for converting an arbitrary inhomogeneous index profile to one consisting of discrete layers of high and low index materials.

For a given thin homogeneous layer of index N and physical (or geometrical) thickness T, the characteristic matrix M (see Epstein, supra) is, at normal incidence:

$$M = \begin{pmatrix} \cos\phi & (i/N)\sin\phi \\ iN\sin\phi & \cos\phi \end{pmatrix} \quad (1)$$

where the phase thickness $\phi$ is given by:

$$\phi = (2\pi/\lambda)NT \quad (2)$$

For thin layers satisfying:

$$NT << \lambda \quad (3)$$

the trigonometric functions in Equation (1) may be replaced by their small argument approximations, so that M becomes:

$$M = \begin{pmatrix} 1 & i(2\pi/\lambda)T \\ i(2\pi/\lambda)N^2T & 1 \end{pmatrix} \quad (4)$$

For a combination of two thin layers, one having a high index ($n_H$, $t_H$) and the other having a low index ($n_L$, $t_L$), the characteristic matrix is found by matrix multiplication of the single layer characteristic matrices to obtain:

$$M = \begin{pmatrix} 1 & i2(\pi/\lambda)(t_H + t_L) \\ i(2\pi/\lambda)(n_H^2 t_H + n_L^2 t_L) & 1 \end{pmatrix} \quad (5)$$

By comparing Equations (4) and (5), a single layer equivalent to the high-low pair can be identified. The conditions are:

$$T = t_H + t_L \quad (6)$$

and $$N^2 = (n_H^2 t_H + n_L^2 t_L)/(t_H + t_L) \quad (7)$$

Given a single layer with index N and thickness T, and two materials with indices $n_H$ and $n_L$, Equations (6) and (7) can be solved for the thicknesses of the high-low pair which is equivalent to the single layer:

$$t_H = T(n^2 - n_L^2)/(n_H^2 - n_L^2) \quad (8)$$

$$t_L = T - t_H \quad (9)$$

The inhomogeneous layer is divided into many thin, discrete layers, the number being sufficient to maintain performance. Each one of these sublayers is then replaced by a two layer approximation whose component thicknesses are specified by equations (8) and (9).

Note from Equation (6) that the equivalent layer has the same physical thickness as the sum of the component layers. This is a surprising result, since one might have thought that, in the thin layer limit, equal optical thicknesses would be necessary to keep things equivalent.

Another feature of Equations (4) and (5) is that thin layer characteristic matrices commute. That means that it does not matter in which order the matrices appear. In fact, it can be shown that in the thin layer approximation the symmetric three-layer Herpin combinations reduce to Equations (6) and (7) when two of the layers are interchanged (commuted) to produce a high-low pair.

A third important feature of the thin layer high-low equivalent result proceeds from Equation (7), which indicates that the dielectric constant of the mixture $\epsilon = N^2$ is linear with respect to the dielectric constants of the component layers.

The technique for replacing a generalized gradient-index coating (consisting of either homogeneous or inhomogeneous layers) by a sequence of high and low index layers is as follows. Divide the coating into thin homogeneous layers, even though adjacent layers may have the same index. Let the thickness of these sublayers satisfy Equation (3) and set the index of each layer to the average index across its thickness. Next, replace each of these layers by a thin high-low pair whose thicknesses are determined according to Equations (8) and (9). The resulting configuration is a digital equivalent and has the same total physical thickness and the same spectral characteristics.

Figure 2:
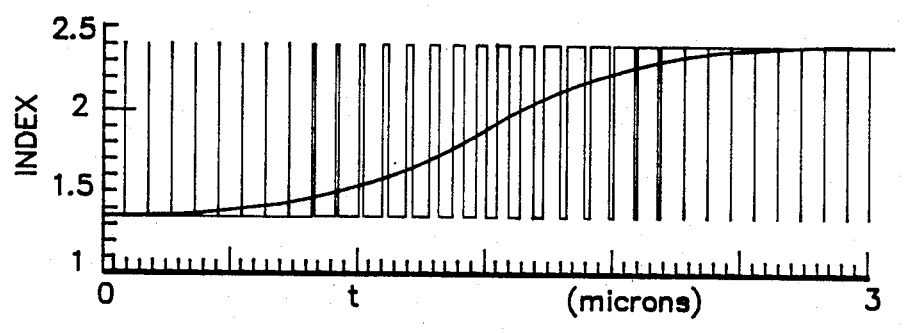
FIG. 2A illustrates the refractive index profile for a quintic index profile and its digital (high-low index) equivalent.
FIG. 2B depicts calculated reflectivity for each of the profile in FIG. 2A.
Figure 2:
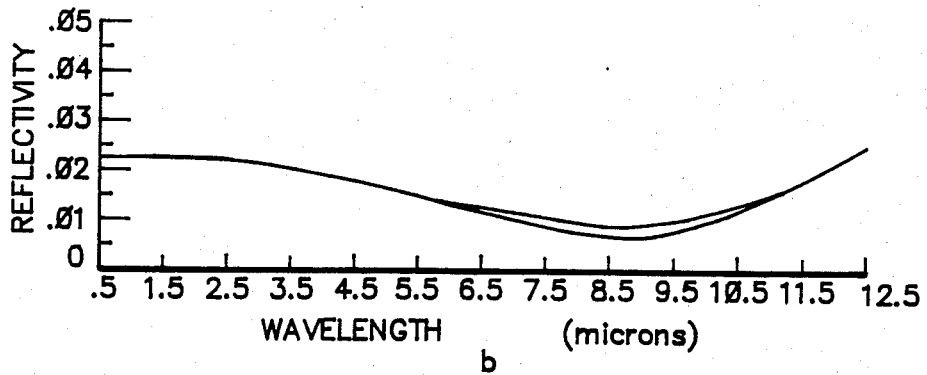

An example is shown in FIG. 2. A quintic (fifth-order polynomial) index profile is known to represent an effective broadband antireflection coating. FIG. 2a illustrates a quintic refractive index profile and its digital equivalent. FIG. 2b depicts the reflectivity which is obtained for the gradient and digital profiles. Agreement between the two reflectivity curves becomes perfect as the sublayers used are made thinner.

Figure 3:
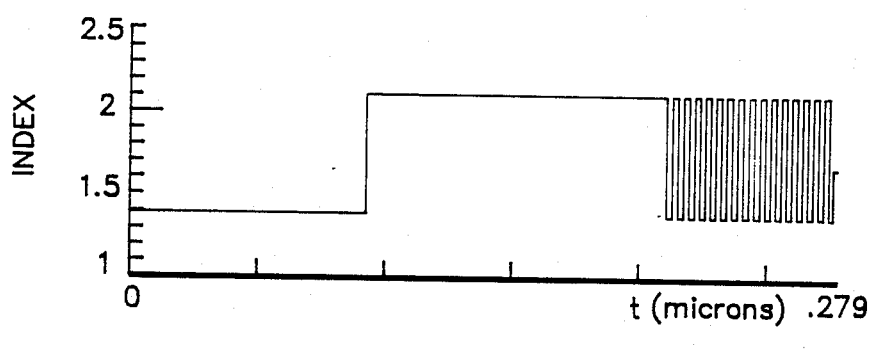
FIG. 3A depicts a refractive index profile for a three layer, quarter-wave, half-wave, quarter-wave antireflective coating, where the third layer is replaced by its digital equivalent.
FIG. 3B is a plot of the calculated reflectivity for the coating of FIG. 3A.
Figure 3:
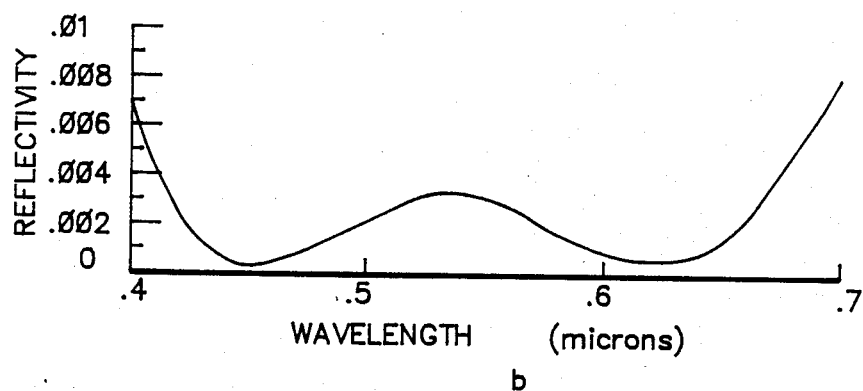

A second example is provided in FIG. 3, which illustrates the use of thin high-low equivalents to represent a layer of an intermediate index. Here, the antireflection coating is designed to reduce reflections from a glass substrate. The original coating consists of a quarter-wave of low index material, a half-wave of high index material, and a quarter-wave of an intermediate index layer whose value is determined to optimize the broadband performance. In the index profile of FIG. 3a, this third layer is replaced by a digital equivalent. The use of the Herpin symmetrical three-layer combination could also replace the third layer, but broadband performance would be slightly different due to the dispersion of the Herpin equivalent layers. The calculated reflectivity for the coating shown in FIG. 3a is depicted in FIG. 3b.

The coating synthesis approach seeks in general to find an index distribution which produces a given spectral reflectance (or transmittance). This is basically an inverse scattering problem and its most general solution is a generalized gradient-index distribution. By generalized is meant a distribution which allows index discontinuities, homogeneous index regions, and inhomogeneous or gradient-index regions. Current design practice, however, seeks approximate solutions consisting of homogeneous layers of nominally quarter-wave optical thickness. Since generalized gradient-index distributions have thin layer high-low equivalents, searching for thin layer digital solutions can yield improved solutions.

The performance of such a multilayered gradient index film can be further improved by applying a synthesis technique, such as that described by Snedaker, "New Numerical Thin-Film Synthesis Technique", Journal of the Optical Society of America, Volume 72, Page 1732 (1982). In this approach, the reflectivity of the film at several wavelengths over the spectrum is evaluated using conventional matrix theory for homogeneous layers. The index of each layer is then separately adjusted, by varying the thicknesses of the sublayers within the appropriate sublayer pair, to minimize the broadband reflectivity. Snedaker's method uses fixed layer thicknesses, but adjusts the index of each sublayer in a continuous fashion to improve the merit function. This sublayer index optimization requires several merit function evaluations including those required to form derivatives for a nonlinear search technique. Furthermore, convergence is slow, requiring several dozen or even hundreds of passes. Then, when a solution is found, intermediate index sublayers must be dealt with (these sublayers could be replaced by high-low thin layer equivalents). The approach of the present invention, however, directly obtains a high-low digital equivalent to a generalized gradient-index solution.

It is an outstanding feature of this invention to derive digital solutions for a given desired spectral response profile by using the following synthesis algorithm:

1. Specify a total physical thickness for the coating. Divide this thickness into a series of thin layers, each of equal thickness.

2. Assign one of two indices, either high or low, to each layer in the series. The convergence of an iterative solution will usually depend on the starting values, so this step can be important. Four possible initial schemes are:

a. Start with all high index layers.
   b. Start with all low index layers.

c. Start with alternating high and low index layers.

d. Start from some known approximate solution.

The first three approaches require no knowledge of thin-film theory, while the fourth attempts to utilize such experience.

3. Evaluate a merit function based on the desired spectral response. One example is the least squares sum, in which the difference between the calculated reflectivity and the desired reflectivity at various wavelengths across the band of interest is squared and the squared differences are summed. The characteristic matrix theory, supra, is used to evaluate the calculated response.

4. Change the state of each layer (from low to high index or from high to low) one at a time and reevaluate the merit function. If the performance is better with that layer having the "flipped" index state, then retain the change; otherwise, restore that layer to its previous index.

5. If, after testing all the layers (a single pass), the merit function shows improvement, then repeat step 4. If no further improvement is indicated, the optimum filter design has been obtained. Layers of the specified thickness and index value are then deposited on the optical surface to be antireflected. This process can be accomplished by any of the deposition techniques known to those in the optical coating art.

One advantage of this digital search technique is that there are only two index values. This eliminates the infinity of arbitrary index values to sample. Furthermore, by using a fixed thin-layer thickness, the infinity of thicknesses to sample is eliminated. Of course, by using fixed thin-layer thicknesses some of the generality in being able to duplicate an arbitrary thin-layer index is lost. This loss of generality may be restored, however, by simply employing thinner layers.

Various refinements could be added to the above algorithm. One could, for example, make the high and low index sublayers have the same optical, rather than physical, thickness.

To demonstrate the advantages of this invention, a broadband antireflection coating similar to that shown in FIG. 3 was designed for a glass surface with a total coating thickness of 0.279 μm (to have the same total thickness as the more classical design shown in FIG. 3). The substrate had a refractive index of 1.52 and layer materials with incices of $n_L = 1.388$ and $n_H = 2.027$ were used. The film was divided into 100 sublayers. All sublayers were initially assigned the high index material. A least-squares merit function based on zero reflectivity targets at eight wavelengths equally spaced in wave number from 0.4 to 0.7 μm was used to evaluate the reflectivity of the film. After four passes in which the index state of each sublayer was flipped and the coating reevaluated, no further improvement in the reflectivity was noted. The resulting index profile is shown in FIG. 4a, with the corresponding reflectivity depicted in FIG. 4b.

A second film was designed for the same performance parameters, starting this time for alternating high and low index sublayers. Convergence was achieved in only two passes through all the layers. The results of this design are shown in FIG. 5.

Experiments with this design technique using low and high index substrates and a number of different total thicknesses and starting points yielded solutions which seldom required over 10 passes and always exhibited good coating performance.

Figure 4:
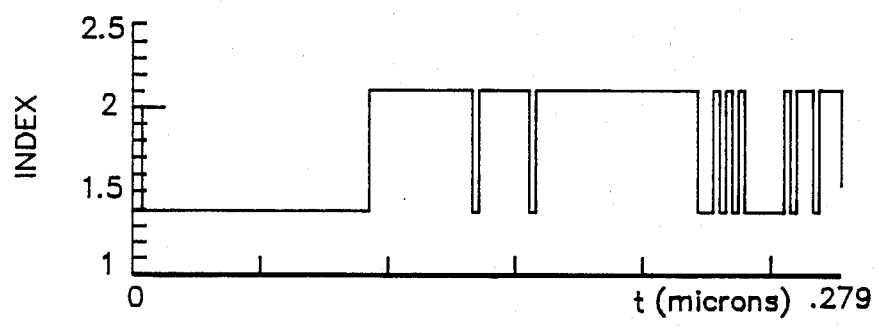
FIG. 4A shows a digital refractive index profile which was obtained by applying the method of the present invention to the performance parameters specified for the coating illustrated in FIG. 3, with all layers initially assigned the high refractive index.
FIG. 4B is a plot of the calculated reflectivity for the profile of FIG. 4A.
Figure 4:
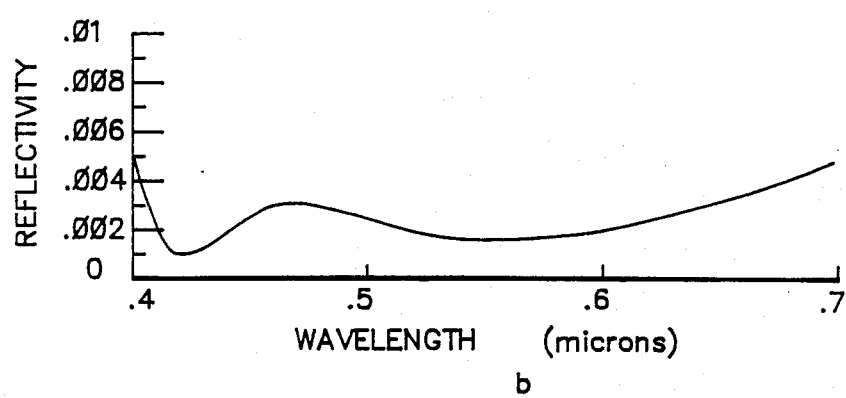
Figure 5:
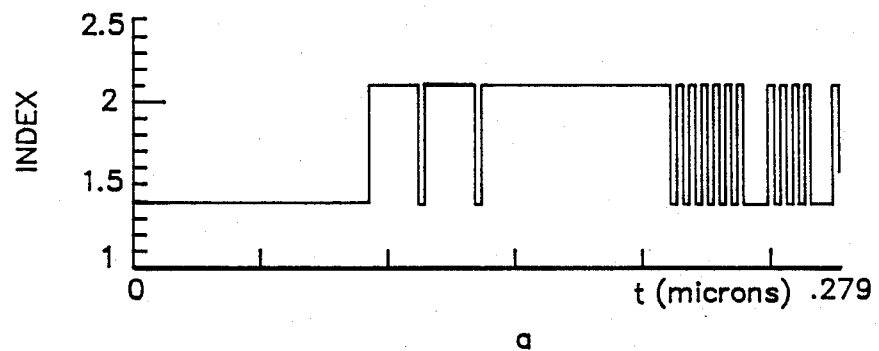
FIG. 5A is similar to FIG. 4A, but shows the profile which was obtained when the layers were initially assigned alternating high and low refractive indices.
FIG. 5B is a plot of the calculated reflectivity for the FIG. 5A profile.
Figure 5:
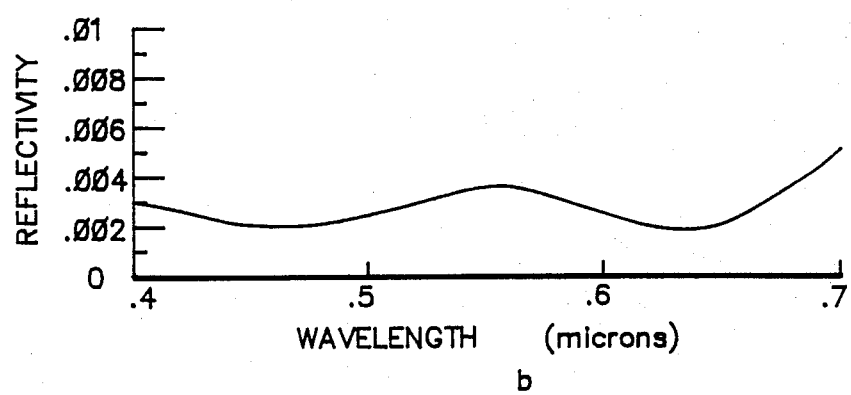

A comparison of FIGS. 4 and 5 shows that the two coating designs are basically similar. There is an approximately quarter-wave low-index layer in each, followed by a half-wave region of predominantly high-index. There is then a third, approximately quarter-wave, region at some intermediate index. These are not identical solutions, but both are acceptable. Generally the small details of the solutions depend on the initial refractive indices specified for the layers, while the gross features tend to be independent of the starting point.

In conclusion, although several particular embodiments of the invention have been described, modifications and additional embodiments will undoubtedly be apparent to those skilled in the art. Consequently, the exemplary embodiments should be considered as illustrative, rather than inclusive, and the appended claims are intended to define the full scope of the invention.

I claim:

1. A method of designing an antireflective optical film for placement between an incident media and a substrate to effect minimal reflectivly from the incident media-substrate interface over a broad spectral band, comprising the steps of:

selecting a first material with a low refractive index and a second material with a high refractive index;

defining a theoretical film comprising a plurality of thin layers of either equal physical or either optical thickness;

specifying the low refractive index or the high refractive index for each layer in the film;

evaluating the reflectivity of the theoretical film;

changing the refractive index of one of the layers to the alternate index;

reevaluating the reflectivity of the defined film;

assigning the alternate refractive index to the changed layer if the reflectivity of the film is improved;

repeating the steps of changing, reevaluating, and assigning for each of the layers in the film until no further improvement in the reflectivity of the film is obtained.

2. The method of claim 1, wherein the step of defining a theoretical film further comprises defining each layer to be substantially thinner than wavelengths within the spectral band to be reflected by the film.

3. The method of claim 1, wherein the step of defining a theoretical film further comprises defining a theoretical film comprising a plurality of thin layers of equal physical thickness.

4. The method of claim 1, wherein the step of defining a theoretical film further comprises.defining a theoretical film comprising a plurality of thin layers of equal optical thickness.

5. The method of claim 1, wherein the step of specifying the low refractive index or the high refractive index for each layer further comprises specifying the low refractive index for each layer in the film.

6. The method of claim 1, wherein the step of specifying the low refractive index or the high refractive index for each layer further comprises specifying the high refractive index for each layer in the film.

7. The method of claim 1, wherein the step of specifying the low refractive index or the high refractive index for each layer further comprises alternately specifying the low refractive index and the high refractive index for successive layers, such that the initial refractive index profile for the film alternates from high to low throughout the film.

8. The method of claim 1, wherein the step of specifying the low refractive index or the high refractive index for each layer further comprises specifying a low refractive index or a high refractive index for each layer such that the refractive index profile for the film corresponds to a predetermined gradient index profile.

9. An antireflective optical film for placement between an incident media and a substrate to effect minimal reflectivity from the incident-substrate interface over a broad spectral band, designed by the steps of:
   selecting a first material with a low refractive index and a second material with a high refractive index;
   defining a theoretical film comprising a plurality of thin layers of either equal physical or equal optical thickness;
   specifying the low refractive index or the high refractive index for each layer in the film;
   evaluating the reflectivity of the theoretical film;
   changing the refractive index of one of the layers to the alternate index;
   reevaluating the reflectivity of the defined film;
   assigning the alternate refractive index to the changed layer if the reflectivity of the film is improved;
   repeating the steps of changing, reevaluating, and assigning for each of the layers in the film until no further improvement in the reflectivity of the film is obtained.

10. The film of claim 9, wherein the step of defining a theoretical film further comprises defining each layer to be substantially thinner than wavelengths within the spectral band to be reflected by the film.

11. The film of claim 9, wherein the step of defining a theoretical film further comprises defining a theoretical film comprising a plurality of thin layers of equal physical thickness.

12. The film of claim 9, wherein the step of defining a theoretical film further comprises defining a theoretical film comprising a plurality of thin layers of equal optical thickness.

13. The film of claim 9, wherein the step of specifying the low refractive index or the high refractive index for each layer further comprises specifying the low refractive index for each layer in the film.

14. The film of claim 9, wherein the step of specifying the low refractive index or the high refractive index for each layer further comprises specifying the high refractive index for each layer in the film.

15. The film of claim 9, wherein the step of specifying the low refractive index or the high refractive index for each layer further comprises alternately specifying the low refractive index and the high refractive index for successive layers, such that the initial refractive index profile for the film alternates from high to low throughout the film.

16. The film of claim 9, wherein the step of specifying the low refractive index or the high refractive index for each layer further comprises specifying a low refractive index or a high refractive index for each layer such that the refractive index profile for the film corresponds to a predetermined gradient index profile.

* * * * *